Oct. 29, 1968            A. J. MATYE            3,408,262
TURBINE BLOWER TYPE DISTILLATION SYSTEM FOR
CONVERSION OF SALINE WATER
Filed May 2, 1966            3 Sheets-Sheet 1
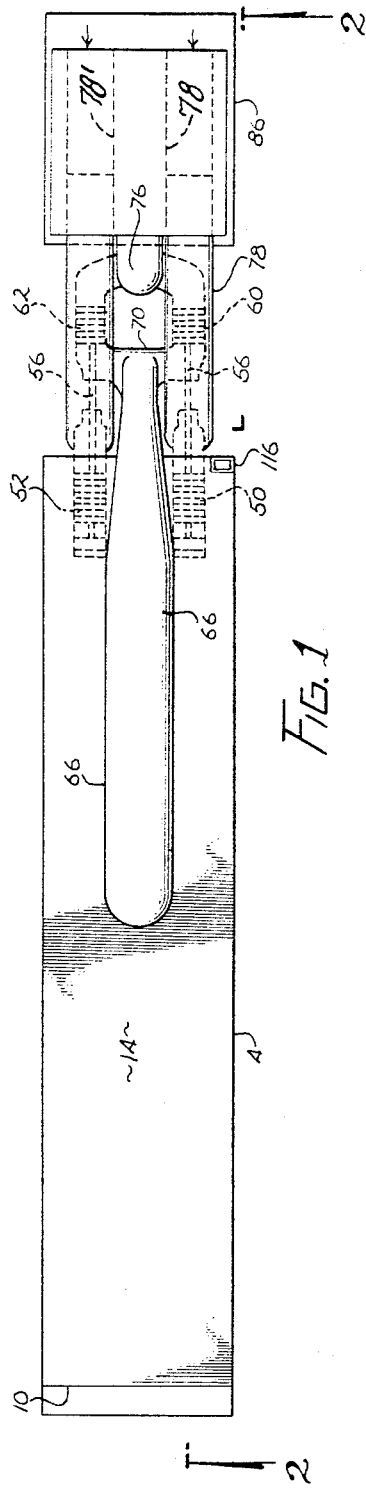
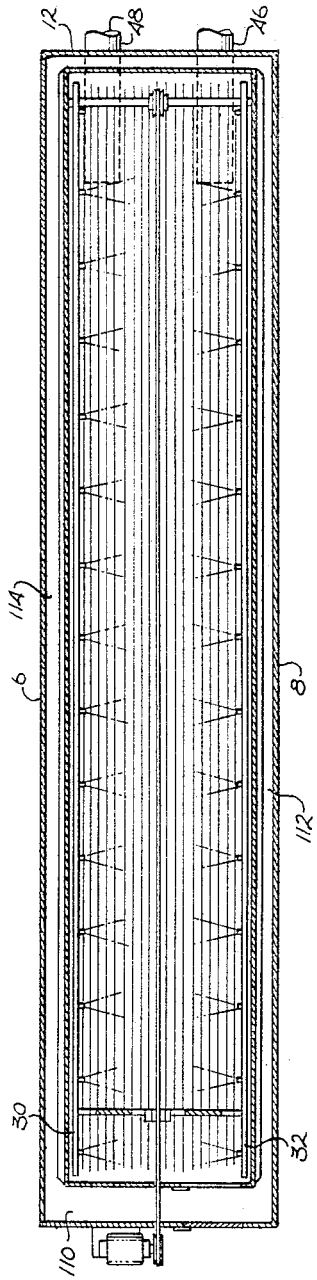
INVENTOR.
ALBERT J. MATYE
BY
R. E. Geange
ATTORNEY Oct. 29, 1968 A. J. MATYE 3,408,262
TURBINE BLOWER TYPE DISTILLATION SYSTEM FOR
CONVERSION OF SALINE WATER
Filed May 2, 1966 3 Sheets-Sheet 2
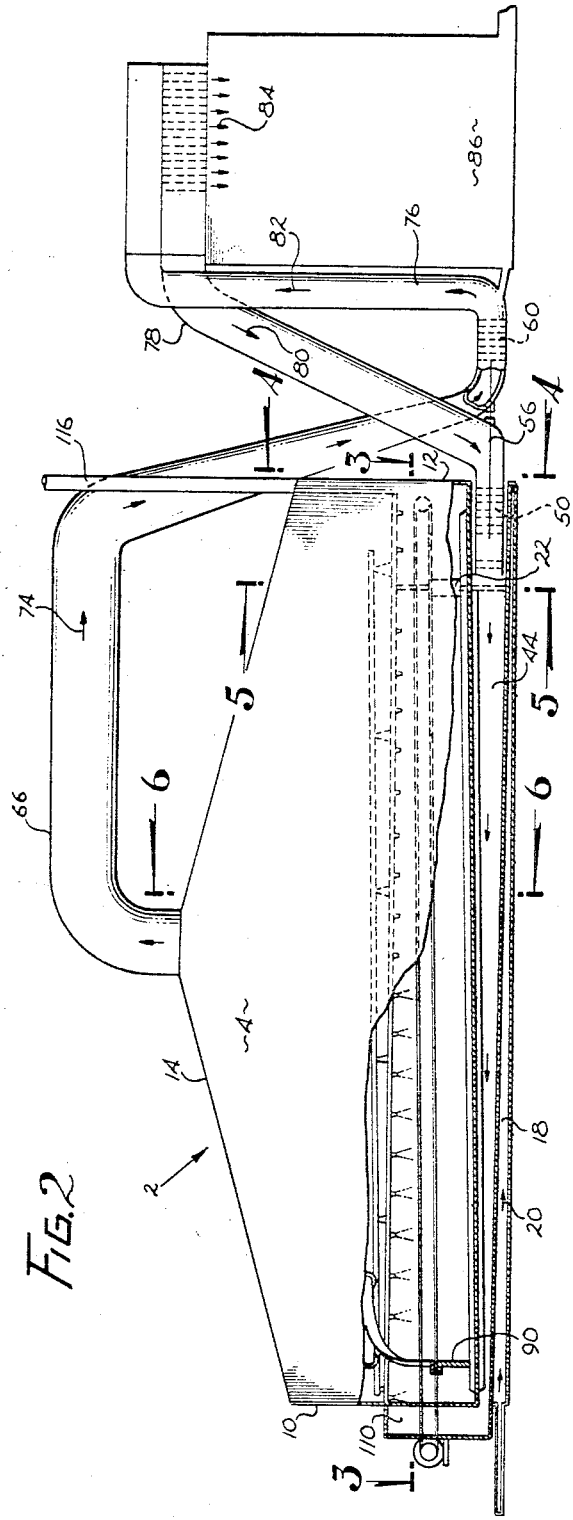
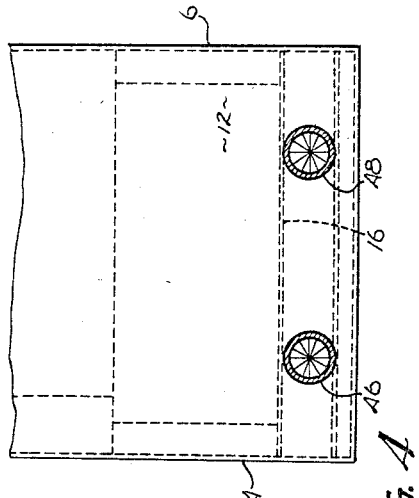
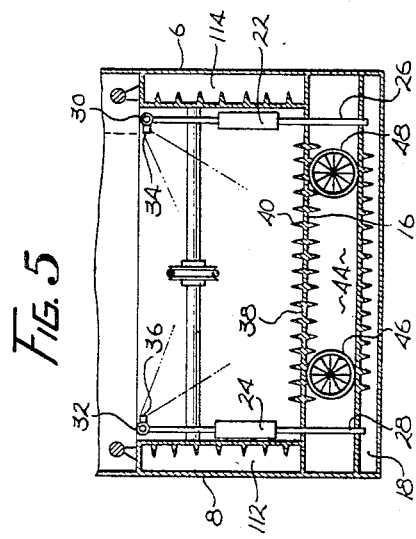
INVENTOR.
ALBERT J MATYE
BY
R. E. Geangue
ATTORNEY

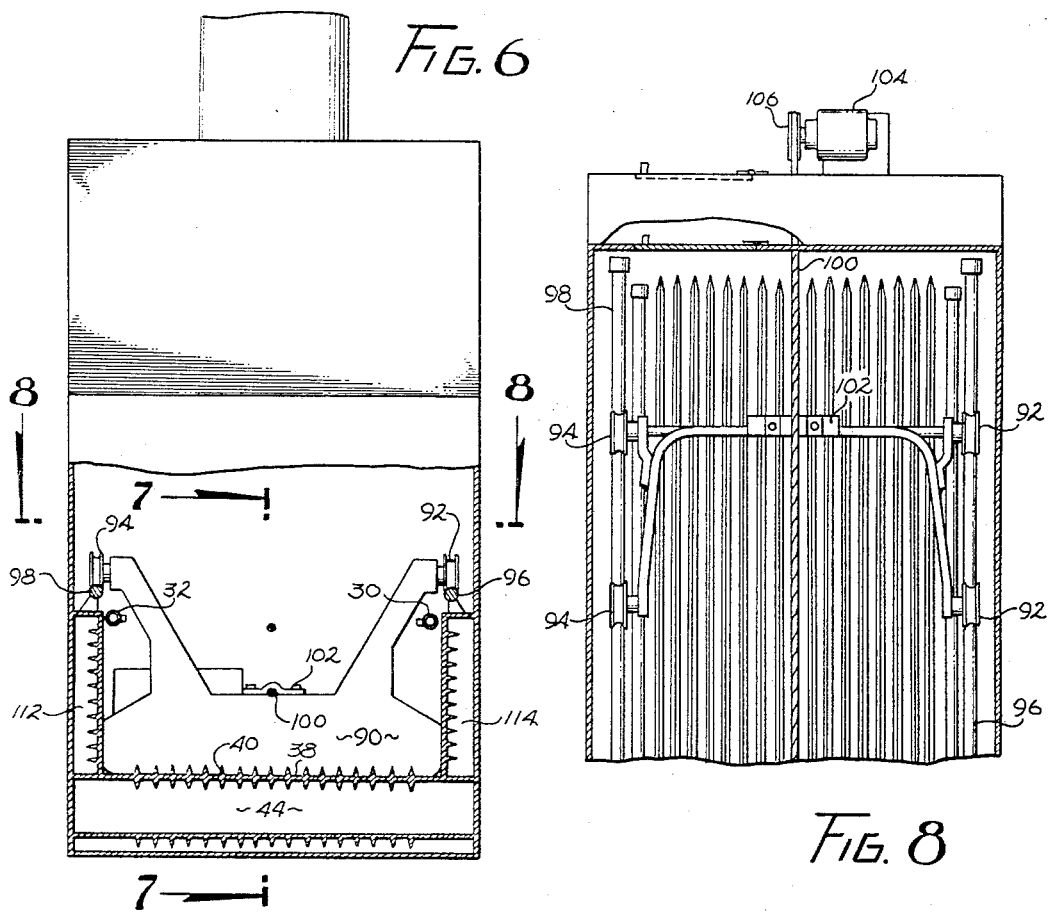
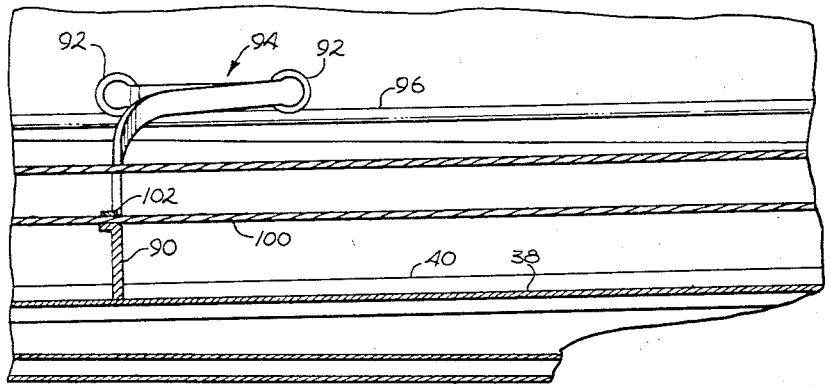

United States Patent Office 3,408,262
Patented Oct. 29, 1968

3,408,262
TURBINE BLOWER TYPE DISTILLATION SYSTEM FOR CONVERSION OF SALINE WATER
Albert J. Matye, 15103 Tuba St.,
Sepulveda, Calif. 91343
Filed May 2, 1966, Ser. No. 546,908
6 Claims. (Cl. 202—177)

ABSTRACT OF THE DISCLOSURE

Salt water is introduced into heat exchange relationship with hot gases produced by turbines. The preheated liquid is discharged by a plurality of nozzles against a hot gas carrying duct to vaporize the liquid in a chamber in which a partial vacuum is created by blowers driven by the turbines. The blowers direct the vapor into a tank at atmospheric pressure where the vapor condenses and is collected.

---

This invention relates to saline water conversion.

More particularly, this invention relates to an apparatus for converting saline water to potable water by a new and improved evaporation system.

There has been a need throughout the past few years, and this need will increase as the years go by, for means to convert saline water to drinking water. This need is compounded by the ever growing population which not only demands more water but the problem is further enhanced by pollution of existing water supplies. Therefore, there is a definite need for providing efficient and economical means for converting saline water to potable or drinking water.

There has been many approaches in the past to this problem which include the distillation process. This process includes evaporation, concentration and other means for separating the salt from the liquid. Other processes which have been suggested are the so called freezing process and ionization. It has been suggested also that great amounts of heat for evaporating the liquid can be obtained through nuclear reactors which heat the water thus evaporating it. Other methods include the flash process which includes the flashing of the liquid into a vapor into contact with a hot surface. It is to this type of saline water conversion to which this invention is directed.

Briefly, this invention comprises an apparatus in which sea water is introduced into a heat exchange relationship with hot gases produced by a turbine. The liquid is thus preheated and is then pumped to a level above the hot gases. The preheated liquid is then discharged by a plurality of nozzles against the hot gas carrying mechanism wherein the liquid is vaporized. A blower is provided which creates a partial vacuum in the chamber so as to draw the steam or vapor away from the chamber. The blower then passes the vapor in heat exchange relationship with incoming air to the turbine so as to condense the vapor, thus providing a source for drinking water.

The objects and advantages of this invention will become apparent as this description proceeds taken in conjunction with the drawings in which:

FIGURE 1 is a top view of the apparatus;

FIGURE 2 is a side view of the apparatus with portions broken away as viewed along the line 2—2 of FIGURE 1;

FIGURE 3 is a view of a portion of the apparatus viewed along the line 3—3 of FIGURE 2;

FIGURE 4 is an illustration of a portion of the apparatus as viewed along the line 4—4 of FIGURE 2;

FIGURE 5 is an illustration of a portion of the apparatus as viewed along the line 5—5 of FIGURE 2;

FIGURE 6 is a view of the apparatus, partly in cross-section, as viewed along the line 6—6 of FIGURE 2;

FIGURE 7 is a portion of the apparatus as viewed along the line 7—7 of FIGURE 6; and FIGURE 8 is a view of the apparatus as shown along the line 8—8 of FIGURE 6.

Referring to FIGURE 2, there is shown an apparatus generally designated as 2 which constitutes a structure constructed according to the teachings of this invention. This apparatus includes a tank 4 which is formed by sidewalls 6 and 8 (see FIGURE 5) and endwalls 10 and 12. A top wall designated generally at 14 is provided while the bottom is closed by an intermediate wall 16. A channel 18 is provided into which sea water or saline water is introduced. This water will flow in the direction of arrow 20 and by means of pumps 22 and 24 will be pumped through conduits 26 and 28, respectively. Water then is caused to flow through conduits 30 and 32 which have a plurality of nozzles 34 and 36 through which the water is sprayed. This water then is sprayed against wall 38 which has ribs 40 thereon to provide a better heat exchange relationship as will more explicitly be brought out as this description proceeds.

In heat exchange relationship with channel 18 is channel 44. Channel 44 has located therein ducts 46 and 48 which receive hot gases from turbines 50 and 52 (see FIGURE 1). These turbines in turn are connected by means of shafts 56 and 58 to blowers 60 and 62. These turbines which may be of a conventional variety generate a great deal of heat.

From the top of container 4 leads a duct 66 which has contained therein blowers 60 and 62 through a branch conduit shown in FIGURE 1 as 70. Thus, vapor passing in the direction of arrows 74 will pass through conduit 66 into branch conduit 70 by means of blowers 60 and 62 and then upwardly through conduit 76 and then pass over inlet conduits 78 and 78'. Thus, there is a heat exchange relationship which tends to heat air coming in the direction or arrow 80 and condensing vapor passing upwardly in the direction of arrow 82. Thus, the liquid being in contact with atmospheric pressure and by being cooled by air passing in the direction of arrow 80 will condense and fall in the direction of arrow 84 to the bottom of tank 86 from which it may be collected or otherwise disposed of.

It may be noted that in all of these channels that ribs or upstanding devices are provided to increase the heat exchange relationship of these various ducts and channels. It may also be noted that when saline water is deposited on surfaces with subsequent evaporation of liquid therefrom, that deposits of salt and other minerals will occur. This invention also provides means for cleaning these surfaces which are in heat exchange relationship. This means is more clearly brought out in FIGURES 6–8. Thus, for cleaning upstanding ribs 40, there may be provided a movable carriage 90 which has cutouts to closely fit around ribs 40 so as to scrape ribs 40. Carriage 90 travels by means of wheels 92 and 94 on rails 96 and 98, respectively. To provide the mode of power, a cable 100 is provided and clamped to carriage 90 by means of clamps 102. A motor 104 is provided which has a pulley 106 adapted to move carriage 90 longitudinally of chamber 4 so as to scrape blades 40. Similar apparatus may be employed to clean the other ribs of the other chambers. For purposes of clarity, however, additional cleaning instruments have not been illustrated, one carriage only being given as an example.

In operation, sea water will enter channel 18 in the direction of arrows 20 and pumped by means of pumps 22 and 24 into conduits 30 and 32. The water is then allowed, by means of nozzles 34 and 36, to enter chamber 4 and thus impinge on wall member 38. At the same time, air entering into conduits 78 and 78' is pre-heated by means of vapor passing in the direction of arrows 84.

This air is then mixed with fuel and allowed to pass into channel 44 by means of ducts 46 and 48 thus heating to a great extent the air in channel 44. This air being heated will preheat the water in channel 18. Wall member 38 and upstanding ribs 40 provide a large surface area which is heated to above the evaporization point of the liquid passing out of the nozzles 34 and 36 so as to flash vaporize the liquid. Hot air in channel 44 will then pass upwardly through channel 110 and then through the side chambers 112 and 114 shown in FIGURE 5. The hot gas is then vented through pipe 116 (see FIGURE 2).

At the same time that the hot gas is passing through channel 44, blowers 62 and 60 create a partial vacuum in chamber 4. Thus, the combination of the partial vacuum and the high temperatures encountered by contact of the liquid with wall member 38 and ribs 40 will cause a flash vaporization. The blowers then cause the vaporized liquid to pass in the direction of arrow 74 in conduit 66 and then upwardly through conduit 76 ultimately in contact with inlet wall of conduits 78 and 78' thus condensing the liquid while at the same time preheating the air. The liquid is then ultimately condensed in chamber 86 and disposed of in any manner desired.

In addition, by actuation of motor 104, the scrapers can be actuated when desired so as to clean sediment and salt off the heat exchange members of the various channels. The illustration being that of wall 38 and ribs 40.

Although not shown, insulation is provided about the apparatus to prevent excessive heat loss. In addition, heat sensing means such as thermal couples are provided to regulate incoming water flow when used in combination with a control circuit and variable valve means in the water line. Alternatively, the water pumps may be controlled so as to vary the rate of incoming flow. By this arrangement, the wall member temperatures can be maintained at the desired level.

The amount of fuel fed to the turbines can likewise be controlled by providing a control circuit actuated by the temperature of the exhaust gas.

One of the more important features of this invention resides in the dual use of the combustion process in the turbines. The exhaust gases not only cause the generation of steam through the heat exchange process, but in addition serve to power the blowers to create a partial vacuum in the chamber. This serves to lower the boiling point of the steam thus providing a more efficient process.

Another important feature is the relationship of the blower and the condensing unit. The blower creates the lower pressure in the chamber, thus lowering the necessary temperature to vaporize the water but also acts as a compressor when the steam passes therethrough. Condensation then occurs due to the combination of atmospheric pressure which raises the boiling point and exposure to a colder ambient temperature. These two factors expedite the condensation of the steam.

In addition to increased efficiency of the unit, several other advantages manifest themselves. These include compactness and easy maintenance. Furthermore, since the steam is at a lower temperature, a larger amount of water per unit volume is carried through the unit.

Thus it can be seen by this invention that an efficient apparatus employing turbines, blowers and heat exchangers, an efficient and relatively simple device is provided yet is effective for converting saline water to potable water suitable for drinking purposes and the like.

Having described this invention, it is understood that it is limited only by the claims appended hereto.

What is claimed is:
1. A saline water converter comprising a first chamber adapted to receive saline water for preheatment, a second chamber in indirect heat exchange relationship with said first chamber, turbine means adapted to discharge hot gases into said second chamber for heating the walls of the chamber and preheat saline water introduced into the first chamber, flash evaporator means constituting a third chamber, conduit means connecting said first and third chambers for conveying preheated saline water from the first chamber to the third chamber, means for distributing the preheated saline water conveyed from the first chamber as a spray onto a heated wall of the third chamber to cause the saline water to evaporate forming water vapor, an overhead vapor collector communicating with said third chamber, blower means drivingly connected to said turbine, said blower connected at its inlet to said overhead vapor collector for withdrawing vapor and creating a vacuum pressure in the third chamber, air supply means to the turbine adapted to condense said vapor after withdrawal from said third chamber, and means for collecting the condensed vapor.

2. A saline water converter according to claim 1 and further including means to scrape the interior of said third chamber means whereby to remove salts therefrom.

3. A saline water converter according to claim 1 wherein said means to distribute said preheated water on said third chamber comprises spray nozzles.

4. A saline water converter comprising:
heated wall means located in a chamber for evaporating saline water;
means for spraying saline water against said wall means to evaporate water in said chamber;
turbine means for producing hot gases;
duct means connected to said turbine and receiving said hot gases and passing the same in heat exchange with said chamber;
for heating said wall means;
air inlet duct means for passing cool air to said turbine;
blower means driven by said turbine means;
said blower having an inlet and an outlet for passing water vapor;
means comprising a branched conduit for connecting the inlet to said blower means to said chamber for creating a vacuum in said chamber and drawing water vapor out of said chamber and passing the water vapor through said branched conduit to the inlet to the blower means; and condenser means comprising tank means at atmospheric pressure connected to the outlet of said blower means and which is maintained in heat exchange with the cool air passing to the turbine for receiving and condensing said water vapor.

5. A saline water converter as defined in claim 4 having means for preheating said saline water with said hot gases prior to entering said spraying means.

6. A saline water converter as defined in claim 4 having means for passing incoming air from said tank means to said turbine means in heat exchange relationship with said water vapor directed to said tank by said blower means.

References Cited

UNITED STATES PATENTS

| | | | |
|---|---|---|---|
| 2,372,846 | 4/1945 | Nettel et al. | 202—236 X |
| 2,515,013 | 7/1950 | Kruhmin | 202—182 X |
| 2,619,453 | 11/1952 | Andersen | 202—236 X |
| 3,234,109 | 2/1966 | Lustenader | 203—11 |
| 3,248,304 | 4/1966 | Goeldner | 202—236 X |
| 3,248,306 | 4/1966 | Cummings | 202—205 X |
| 3,252,501 | 5/1966 | Loebel et al. | 202—236 X |
| 3,284,318 | 11/1966 | Coanda et al. | 203—11 X |
| 3,312,600 | 4/1967 | Morton | 202—236 X |
| 2,389,789 | 11/1945 | Latham | 203—21 X |
| 2,637,684 | 5/1953 | Buffum | 203—22 X |
| 3,290,229 | 12/1966 | Brown | 203—11 X |
| 3,356,591 | 12/1967 | Peterson | 203—26 X |

FOREIGN PATENTS 24,930  12/1956  Germany.

NORMAN YUDKOFF, *Primary Examiner.*

F. E. DRUMMOND, *Assistant Examiner.*